United States Patent
Ito

[11] Patent Number: 5,313,402
[45] Date of Patent: May 17, 1994

[54] MIDWAY START METHOD IN NUMERICAL CONTROL SYSTEM

[75] Inventor: Kenji Ito, Niwa, Japan
[73] Assignee: Okuma Corporation, Nagoya, Japan
[21] Appl. No.: 983,757
[22] Filed: Dec. 1, 1992
[30] Foreign Application Priority Data
  Dec. 5, 1991 [JP] Japan .................................. 3-348690
[51] Int. Cl.$^5$ ............................................. G06F 15/46
[52] U.S. Cl. ............................... 364/474.23; 364/188; 364/474.26; 364/474.21
[58] Field of Search ............... 364/188, 192, 474.22, 364/474.27, 474.21

[56] References Cited
U.S. PATENT DOCUMENTS

| | | | |
|---|---|---|---|
| 4,497,029 | 1/1985 | Kiyokawa | 364/474.21 |
| 4,750,105 | 6/1988 | Ohkawa et al. | 364/191 |
| 4,794,514 | 12/1988 | Hideaki et al. | 364/474.22 |
| 4,878,172 | 10/1989 | Matsumura | 364/191 |
| 5,041,985 | 8/1991 | Fujita | 364/474.21 |

Primary Examiner—Jerry Smith
Assistant Examiner—Jim Trammell
Attorney, Agent, or Firm—Wenderoth, Lind & Ponack

[57] ABSTRACT

According to this invention method for starting a machining program midway for a numerical control system, an operator simply selects with a cursor key a tool number or a tool offset number of the tool which is to be used for the machining step the operator wishes to execute out of the numbers displayed on the screen and can easily start the machining program from the top block of the desired machining step or the tool command block with the selected tool number or the tool offset number. By selecting the shape of the tool which is to be used for the machining step by means of a cursor key or the like out of the tool shapes displayed on the screen, the operator can start the machining program midway from the top block of which tool number or the tool offset number is designated. When the machining program is to be started from midway according to the method, as the machining path of a step is displayed, the operator can confirm whether the block to start the machining program midway is right or wrong.

4 Claims, 9 Drawing Sheets

MIDWAY START METHOD IN NUMERICAL CONTROL SYSTEM

BACKGROUND OF THE INVENTION

1. Field of the Invention

This invention relates to a method for midway starting a machining program in a numerical control (NC) system, and more particularly, relates to a method for starting the machining process in a unit of a step in the numerical control system.

2. Description of the Prior Art

If the product dimensions in a drawing are highly precise, machining is conducted generally in the following steps (1) to (3);

(1) The first machining is conducted for a work by subtracting or adding a predetermined value from or to a preset tool offset value. The work which has been cut by the first machining process is of the size of a product plus a constant finishing stock.

(2) Then, the dimension of the work which has been cut by the first machining is measured and the difference between the measured size and the product size is subtracted from or added to the tool offset value.

(3) With the modified tool offset value, only the finishing step is repeated.

When the machining is conducted according to the steps mentioned above, since the second machining concerns only the finishing step, the numerical control system has to be started midway of a machining.

Figure 1:
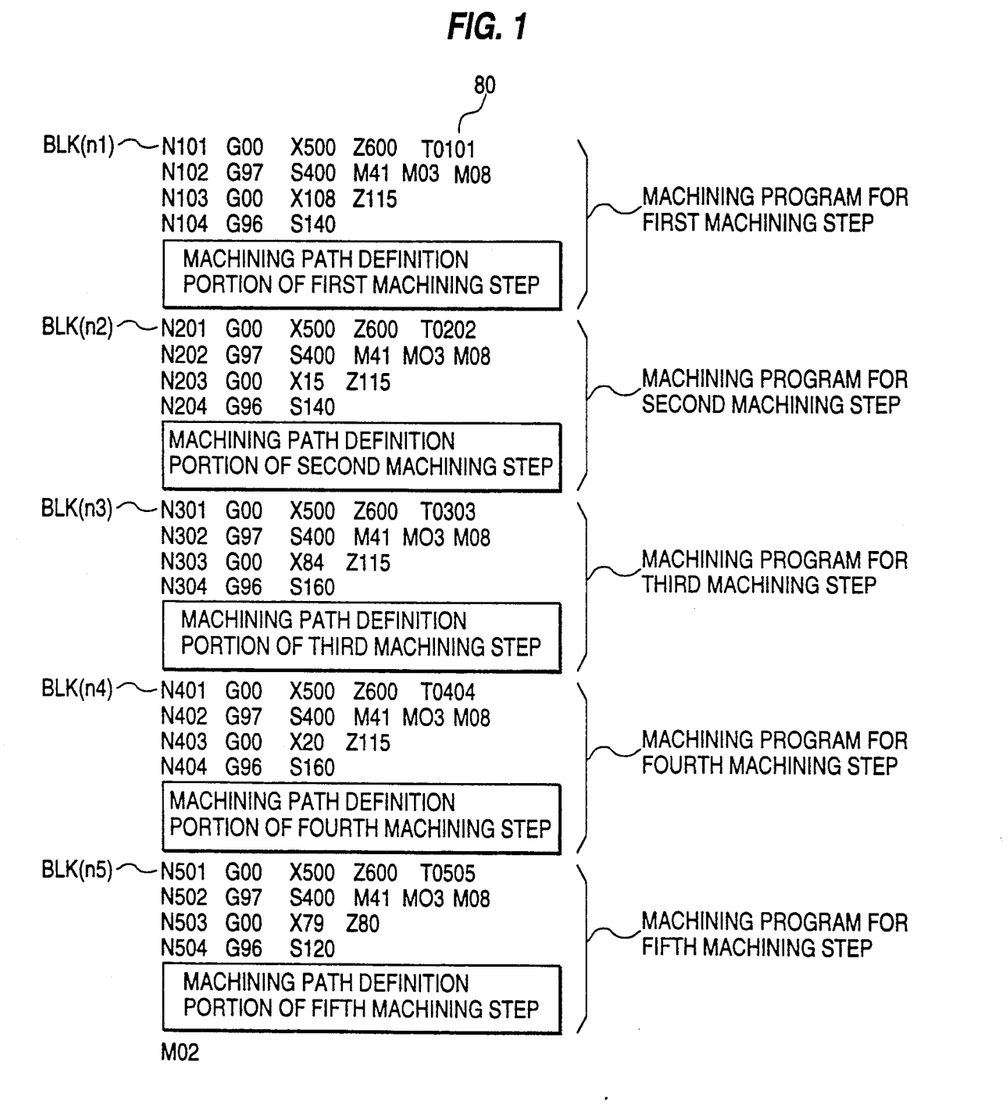
FIG. 1 is a view to explain the general machining program.

As shown in FIG. 1, a machining program generally comprises of programs for each machining step which are arranged in the order of the machining. If it is assumed that the machining program for each machining step is a step program, and each block of the machining program is expressed as follows, then the machining program comprising five machining steps is regarded as step programs with blocks of BLK (n1), BLK (n2), BLK (n3), BLK (n4) and BLK (n5) arranged at the top of each step in the sequence of the machining order.

where BLK (n): n means the number of blocks counted from the top block in the machining program.

Since the machining step is defined by a tool to be used in the machining, the top block of each step program is a block designating a tool in which a tool change command 80 is written. Therefore, the top block of each step program becomes as follows;

BLK (n1): the tool command block for the first machining step

BLK (n2): the tool command block for the second machining step

BLK (n3): the tool command block for the third machining step

BLK (n4): the tool command block for the fourth machining step

BLK (n5): the tool command block for the fifth machining step.

The blocks included in the machining step become as follows;

The first machining step: BLK (n1) to BLK (n2−1)

The second machining step: BLK (n2) to BLK (n3−1)

The third machining step: BLK (n3) to BLK (n4−1)

The fourth machining step: BLK (n4) to BLK (n5−1)

The fifth machining step: BLK (n5) to . . .

It is now assumed that the following five machining steps are required to machine the work in accordance with the product dimensions designated in a drawing.

The first machining step: roughly cut outer diameter

The second machining step: roughly cut inner diameter

The third machining step: finishing outer diameter

The fourth machining step: finishing inner diameter

The fifth machining step: groove

When the tool offset value is modified and the work is to be machined only for the finishing step, the machining for the second time is to start from the third step (or the step for the finishing outer diameter). In other words, the top block BLK (n3) of the third machining step is designated in the command as the midway starting block to start the machining.

Figure 2:
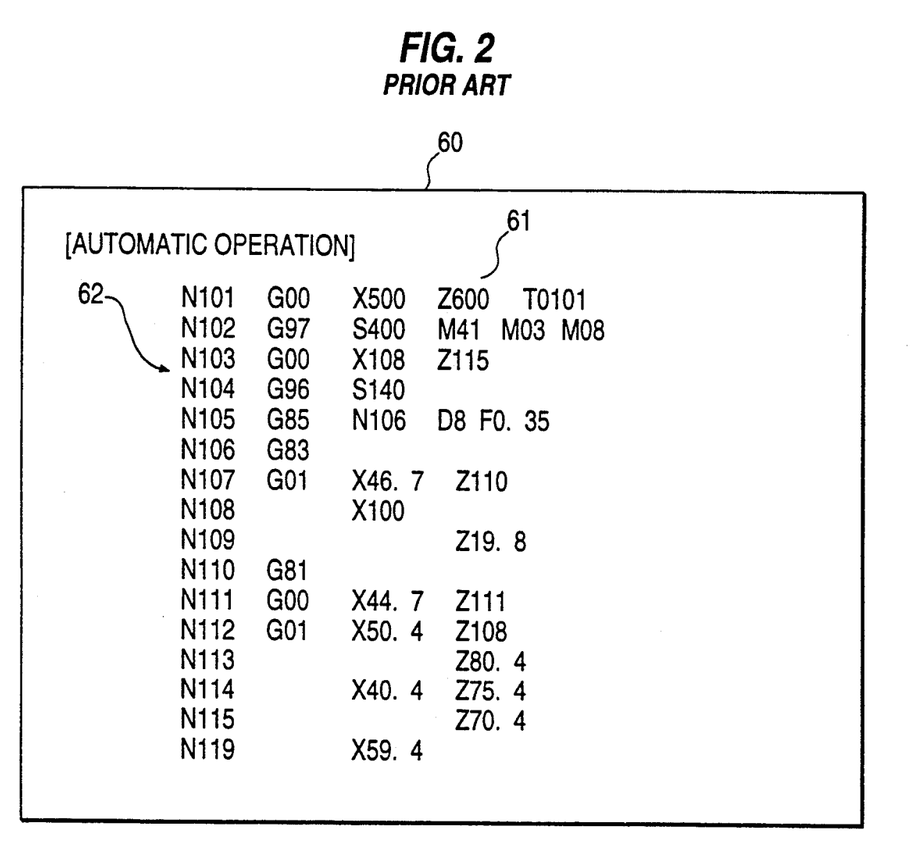
FIG. 2 is a view to show an example of the display screen according to the conventional method.

For the method to designate a desired block (the top block of the machining program which the user wishes to execute) as the midway start block, FIG. 2 shows the display screen which indicates required operations as shown below:

(1) A machining program 61 is displayed on the display screen 60.

(2) The display is renewed until the desired block is displayed by means of a page key or the like.

(3) The cursor 62 is moved to the desired block by means of a cursor key.

If the machining program is executed under such conditions, it will start from the block (the block for midway start) at which the cursor 62 is positioned.

Figure 3:
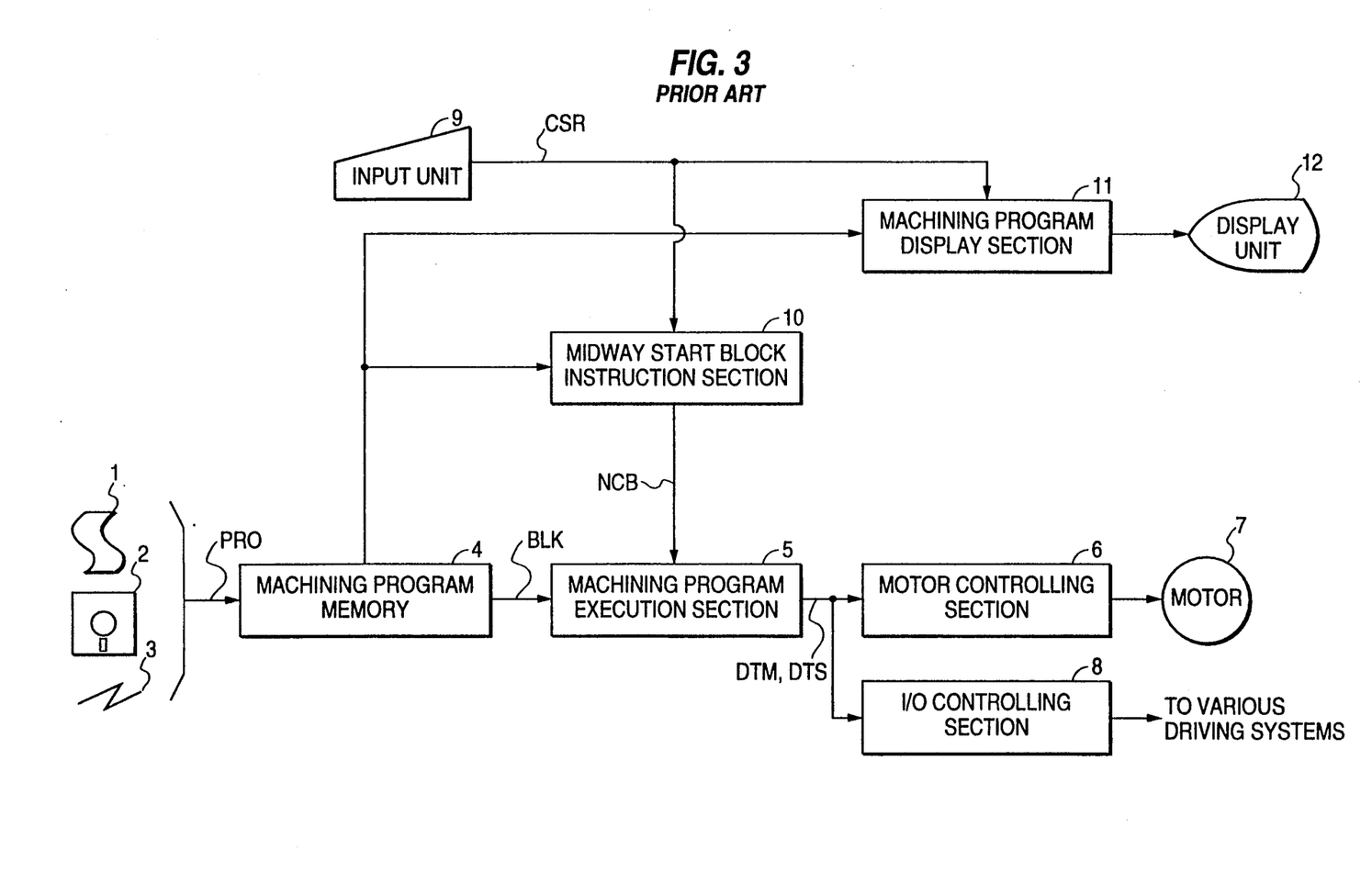
FIG. 3 is a block diagram to show an embodiment of the numerical control system to realize the midway start method for NC system in the prior art.

FIG. 3 is a block diagram to show an embodiment to realize a conventional midway start method. The conventional method will now be described referring to FIG. 3.

A machining program PRO to be executed is first stored in a machining program memory 4 in the form of a paper tape 1, a floppy disc 2, communication 3 and so on.

Then, the machining program PRO is read out from the machining program memory 4 and is displayed on a display unit 12 by means of a machining program display section 11. Since the number of blocks which can be displayed on the display unit 12 is limited as shown in FIG. 2, if it is assumed that the blocks BLK (n) through BLK (n+m−1) (wherein m means the number of blocks which can be displayed on the display unit 12) are currently displayed on the display unit 12, and if the key signal CSR sent out from an input unit 9 is a page-up key, the displayed screen is renewed so that the blocks BLK (n+m) through BLK (n+2m−1) will be displayed by means of the machining program display section 11. If the key signal CSR is a page-down key, the display screen will be renewed so that the blocks from BLK (n−m−1) to BLK (n−1) may be displayed on the screen.

In a case that the key signal CSR is for the cursor key, the cursor 62 shown in FIG. 2 is moved correspondingly to the key signal CSR and displayed on the screen. The key signal CSR is also sent out to a midway start block instruction section 10 from the input unit 9 so that the block (=midway start block) indicated by the cursor 62 which is displayed on the display unit 12 is specified based on the key signal CSR by the midway start block instruction section 10, and the number NCB of the blocks from the top block of the machining program to the midway start block is transmitted to a machining program executing section 5.

When a machining start command is inputted from an input unit (not shown), the machining program PRO is read in and interpreted in the unit of a block by means of the machining program executing section 5, and a motor control signal DTM and an I/O control signal DTS are respectively sent out to a motor controlling section 6 and an I/O controlling section 8. In a normal machining, the machining program PRO is read in from the top block BLK (1) by means of the machining program executing section 5, but reading-in will start from the midway start block BLK (NCB) if the number NCB of the blocks from the top to the midway start block is sent out from the midway start block instruction section 10.

A motor 7 comprising a feed shaft motor and a spindle motor or the like is driven by the motor controlling section 6 based on the motor control signal DTM sent out from the machining program executing section 5, and various driving systems are driven by the I/O controlling section 8 based on the I/O control signal DTS sent out from the machining program executing section 5.

In another executing method (sequence return), the machining program executing section 5 may interpret the machining program PRO from the top block BLK (1) to a block BLK (NCB−1) which is immediately preceding the midway start block without sending out the motor control signal DTM and the I/O control signal DTS, and send out the motor control signal DTM and the I/O control signal DTS from the midway start block BLK (NCB).

The conventional midway start method is problematic in the following points. If it is assumed that a machining program comprises the following step programs as shown in FIG. 1;

The first machining step: roughly cut outer diameter
The second machining step: roughly cut inner diameter
The third machining step: finishing outer diameter
The fourth machining step: finishing inner diameter
The fifth machining step: groove, and if the machining program is to be started from the third machining step (for the finishing outer diameter), an operator must move the page key until the time the top block BLK (n3) of the third machining step is displayed, and further must manipulate the cursor key to move it to the top block BLK (n3) of the third machining step. Since the finishing step is usually positioned in the latter part of the machining program, the number of manipulations that the operator should have with keys such as the page key and the cursor key becomes enormous.

The conventional method is further defective in that it is extremely difficult to find a top block (or the tool command block related to the tool which is to be used in the machining step from which he/she wishes to start the machining program) of the machining step from which an operator wishes to start the program out of a large number of blocks displayed on the screen. Since such complicated operation becomes necessary every time he/she manipulates the page key, he/she has to bear a heavy burden and trouble.

SUMMARY OF THE INVENTION

This invention was conceived in order to obviate such problems encountered in the prior art and aims at providing a method for starting a machining program midway in a numerical control system which can specify a particular block from which an operator wishes to start the machining program with a smaller number of key manipulations even if the particular block is situated in the latter part of the machining program, and which does not need to find the block out of the large number of blocks which are displayed on the screen.

According to one aspect of this invention, for achieving the objects described above, there is provided a midway start method in a numerical control system wherein a specified block is selected as a midway start block out of the blocks of a machining program to execute the machining program from said selected midway start block, which comprises the steps of extracting a tool command block wherein a tool exchange command is written from said machining program, displaying the tool numbers or tool offset numbers in the unit of said tool command block, selecting a specified tool number or the tool offset number out of said tool numbers or the tool offset numbers, and determining the tool command block wherein said specific tool number or the specific tool offset number is written as said midway start block.

According to another aspect of this invention, there is provided a midway start method in a numerical control system wherein a specified block is selected as a midway start block out of the blocks of a machining program to execute the machining program from said selected midway start block, which comprises the steps of preparing tool drawing data for each tool number or each tool offset number in advance, extracting a tool command block out of said machining program, displaying tool shapes for each of said tool command blocks based on said tool drawing data corresponding to the tool number or the tool offset number designated in said tool command block, selecting a specific tool shape out of said tool shapes, and determining the tool command block wherein the tool number or the tool offset number corresponding to said specific tool shape is written as the midway start block.

The nature, principle and utility of the invention will become more apparent from the following detailed description when read in conjunction with the accompanying drawings.

DESCRIPTION OF THE PREFERRED EMBODIMENT

Figure 4:
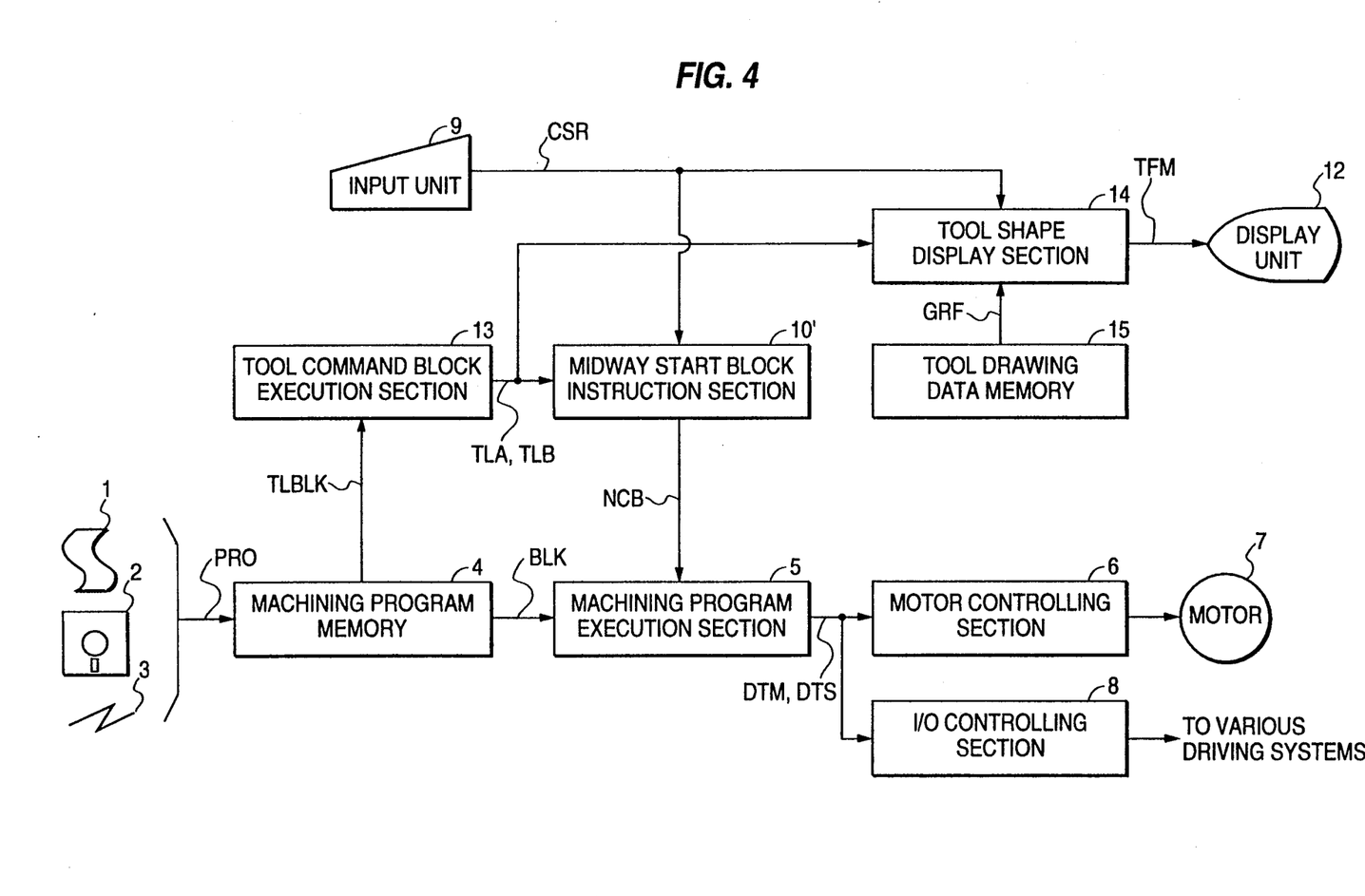
FIG. 4 is a block diagram to show the first embodiment of the numerical control system to realize the midway start method according to this invention.

FIG. 4 is a block diagram to show the first embodiment to realize the midway start method in a numerical control system in correspondence with FIG. 3. The same parts are denoted with the same reference numbers and the explanations thereof are omitted.

A tool command block TLBLK is extracted out of the machining program PRO stored in the machining program memory 4 by means of a tool command block extracting section 13, and the number TLA of blocks from the top block to the tool command block TLBLK is combined with the tool number TLB at the tool command block TLBLK to be sent to a tool shape display section 14 as well as to a midway start block instruction section 10'. Since the tool command blocks exist in a plural number, if the extracted tool command block TLBLK is the Nth tool command block, the number of the blocks from the top block to the tool command block TLBLK becomes "TLA (N)" and the tool number at the tool command block TLBLK becomes "TLB (N)".

As the method to extract the tool command block, there is proposed a method to search a tool change command from the top block of the machining program. The number TLA of blocks from the top block to the tool command block TLBLK may easily be generated by setting the block counter used when the tool change command is searched.

Then, by means of the tool shape display section 14, the tool drawing data GRF is read in from a tool drawing data memory 15 based on the tool number TLB at the tool command block TLBLK sent out from the tool command block extracting section 13 and a tool shape TFM is displayed on the display unit 12 based on the tool drawing data GRF. The tool drawing data GRF is a drawing data defined by each of the tool numbers for tool shape graphic display, and is registered in advance by an operator in correspondence with each tool attached to the machine.

Since the tool drawing data GRF is similar to the drawing data to be used for tool shape display in machining simulation, detailed description on the setting method and data structure thereof will be omitted. Since the tool drawing data GRF is a drawing data defined in the unit of a tool number, if K is assumed to denote a tool number, it would be expressed as follows;

GRF (K): K means a tool number

Therefore, it becomes possible to read in the following from the tool drawing data memory 15 based on the tool number TLB (N).

GRF (TLB (N)): N=1 to the total number of the tool command blocks

The tool shape TFM corresponding to the tool command block can be displayed on the screen if it is read in from the tool drawing data memory 15. The tool shape display section 14 is displaying on the same screen a cursor which indicates one of the plural tool shapes on the display and moving the cursor correspondingly to the key signal CSR sent out from the input unit 9 having the cursor key and so on. Therefore, an operator can select one tool shape (the shape of a tool to be used in the step he/she wishes to start) out of the plural tool shapes TFM on display simply by manipulating the cursor key.

The key signal CSR sent from the input unit 9, on the other hand, is also sent out to the midway start block instruction section 10' so that a tool command block (a midway start block) which corresponds to the selected tool shape is specified by the midway start block instruction section 10' based on the key signal CSR. In the case when the specified midway start block is the Nth tool command block, the number NCB of the blocks up to the midway start block is generated by the midway start block instruction section 10' because the relation holds as NCB=TLA (N) based on the number TLA of the blocks from the top block to the tool command block sent out from the tool command block extracting section 13, and sent out to the machining program executing section 5. Then, the machining program is started midway by the machining start command inputted from the input unit (not shown).

Figure 5:
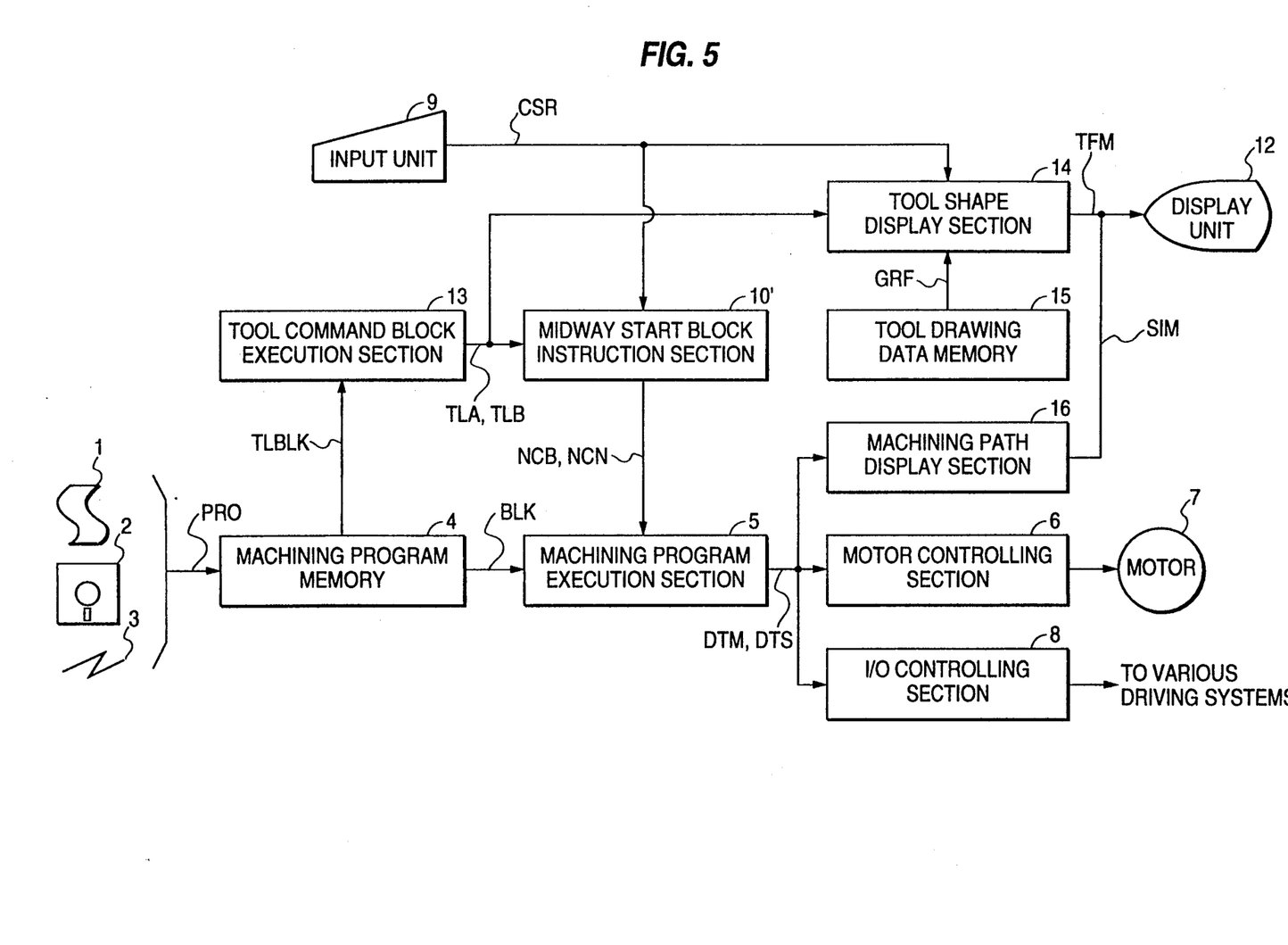
FIG. 5 is a block diagram to show the second embodiment of the numerical control system to realize the midway start method according to this invention.

FIG. 5 is a block diagram to show the second embodiment of the numerical control system which realizes the midway start method according to this invention wherein a machining path display section 16 is newly added. The midway start block instruction section 10' in FIG. 5 generates the number NCB of the blocks up to the midway start block as well as the number NCN of the blocks up to the tool command block which follows immediately after the midway start block in the form of NCN=TLA (N+1).

When the machining path display command is inputted subsequently by an input unit (not shown), the machining program PRO from the midway start block BLK (NCB) to the next tool command block BLK (NCN) is read in one block by one block by the machining program executing section 5 and interpreted, and the motor control signal DTM is sent out to the machining path display section 16.

The machining path display section 16 generates the machining path drawing data SIM based on the motor control signal DTM sent out from the machining program executing section 5, and the machining paths from the midway start block to the next tool command block are displayed on the display unit 12.

Subsequently when the machining start command is inputted from the input unit (not shown), the machining program PRO is read in and interpreted again one block by one block from the midway start block BLK (NCB) by the machining program executing section 5 and the motor control signal DTM and the I/O control signal DTS are sent out to the motor controlling section 6 and the I/O controlling section 8 respectively to start the machining midway.

Figure 6A:
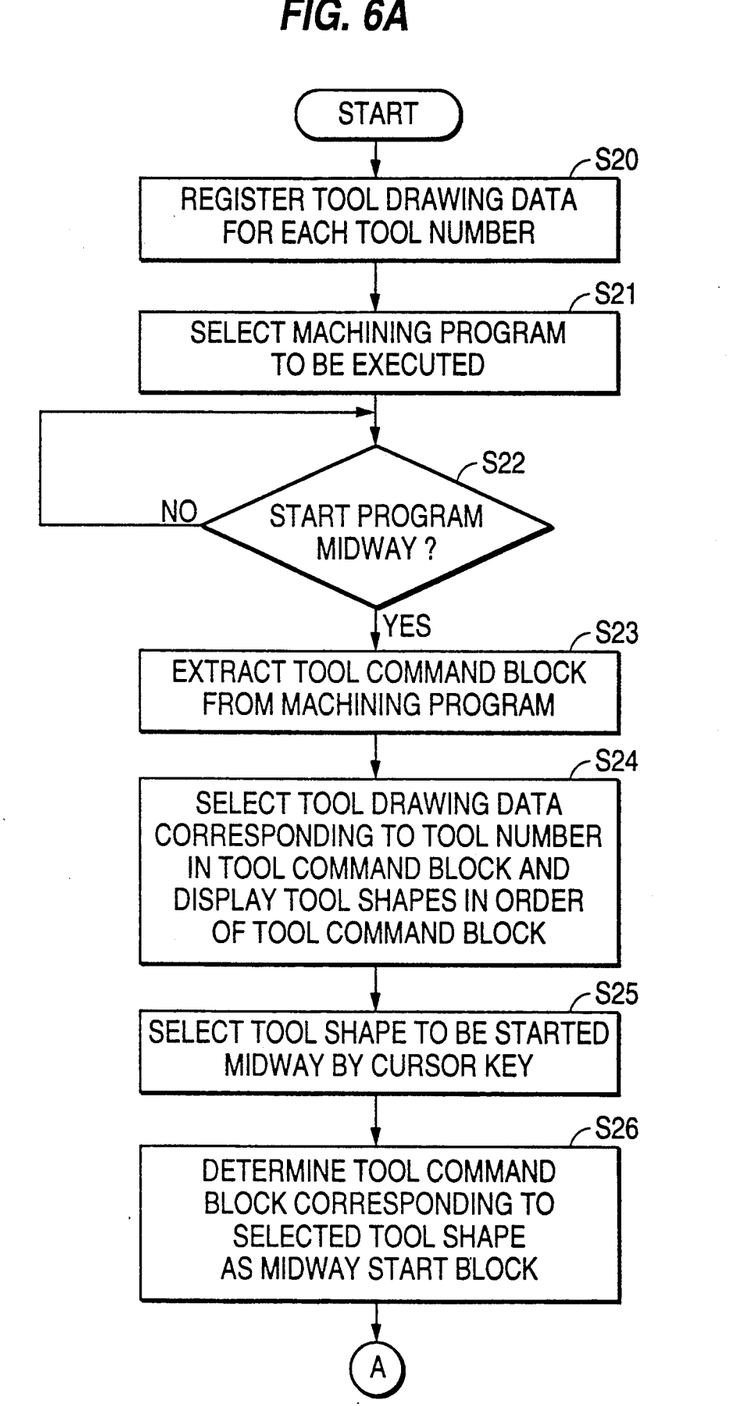
FIGS. 6A and 6B are flow charts to explain this invention method.
Figure 6B:
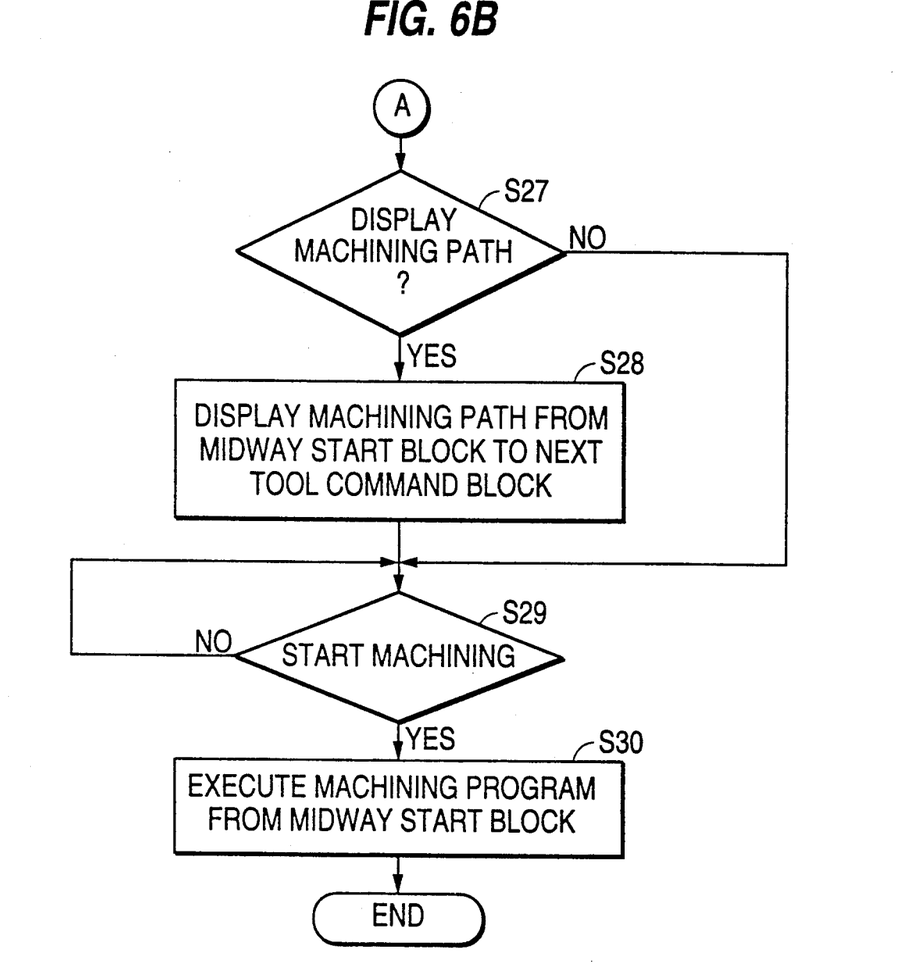
Figure 7:
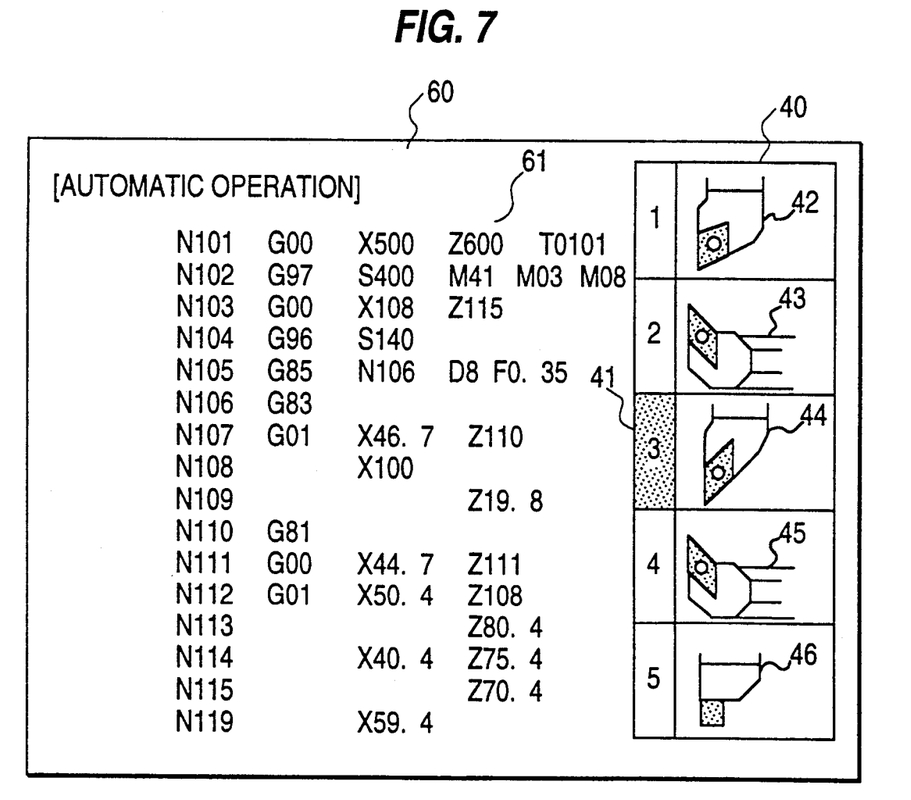
FIG. 7 is a view to show the first example of the display screen of this invention method.
Figure 8:
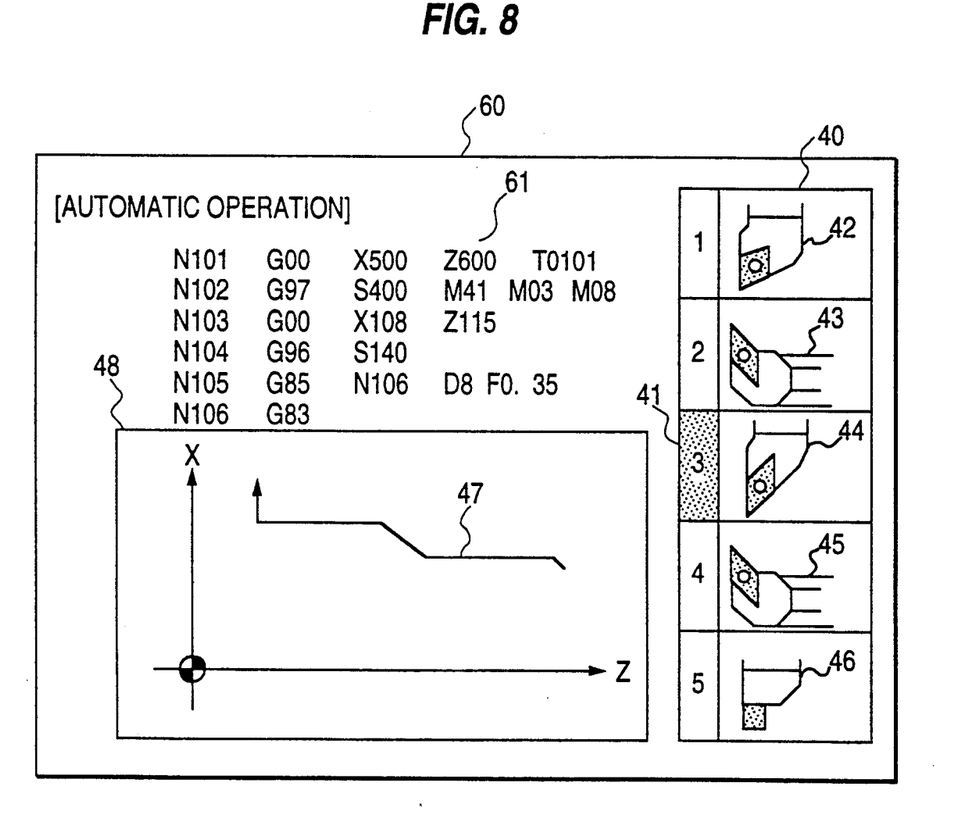
FIG. 8 is a view to show the second example of the display screen of this invention method.

FIGS. 6A and 6B are flow charts to show an example of the midway start method in a numerical control system according to this invention. FIGS. 7 and 8 show examples of the display screen of the midway start method according to this invention. Referring to FIGS. 6A, 6B, 7 and 8, the midway start method according to this invention will now be described. The machining program PRO stored in the machining program memory 4 comprises five step programs with top blocks of BLK (n1), BLK (n2), BLK (n3), BLK (n4) and BLK (n5) respectively as shown in FIG. 1, and the types of the steps and tool numbers are assumed to be as follows:

The first machining step: roughly cut outer diameter, tool number=1,
The second machining step: roughly cut inner diameter, tool number=2,
The third machining step: finishing outer diameter, tool number=3,
The fourth machining step: finishing inner diameter, tool number=4, The fifth machining step: groove, tool number=5.

According to the tools actually attached on the machine, the tool drawing data GRF are registered as follows for each tool number (Step S20);

GRF (1)=a cutter for the outer diameter with tool angle 80°

GRF (2)=a cutter for the inner diameter with tool angle 55°

GRF (3)=a cutter for the outer diameter with tool angle 55°

GRF (4)=a cutter for the inner diameter with tool angle 55°

GRF (5)=a cutter for the groove

If they have already been registered for executing the machining simulation, then the above step S20 will not be necessary.

Then, a machining program to be executed should be selected (Step S21). Usually, since the machining by midway start is the second machining and the machining program to be executed has already been selected, the above step S21 becomes unnecessary. When an operator inputs a command to start the program midway, the tool command block is extracted from the machining program. The number TLA of the blocks from the top block to the tool command block and the tool number TLB at the tool command block are as follows (Steps S22 and S23);

TLA (1)=n1, TLB (1)=1
    TLA (2)=n2, TLB (2)=2
    TLA (3)=n3, TLB (3)=3
    TLA (4)=n4, TLB (4)=4
    TLA (5)=n5, TLB (5)=5

Then a tool drawing data GRF corresponding to the tool number TLB in the tool command block is selected, and a tool shape list table 40 is displayed on the screen 60 as shown in FIG. 7. In the tool shape list table 40, corresponding to the tool drawing data GRF (TLB (1)) through GRF (TLB (5)), the following will be displayed.

Tool shape 42: a cutter for the outer diameter with tool angle 80° (the first machining step)

Tool shape 43: a cutter for the inner diameter with tool angle 55° (the second machining step)

Tool shape 44: a cutter for the outer diameter with tool angle 55° (the second machining step)

Tool shape 45: a cutter for the inner diameter with tool angle 55° (the fourth machining step)

Tool shape 46: a cutter for the groove (the fifth machining step)

The tool shapes 42 through 46 are attached with serial numbers on the display and a cursor 41 is displayed in a manner to be movable over these numbers (Step S24).

By manipulating the cursor key of the input unit, one tool shape (the tool shape of the machining step from which the program should be started midway) is selected out of the plural displayed tool shapes. If the operator wishes to start midway from the third machining step (or the one for the finishing outer diameter), the cursor 41 should be moved to the position of the tool shape 44 for selection (Step S25). The tool command block which corresponds to the tool shape specified with the cursor 41 is determined as the midway start block. When the specified tool shape is the tool shape 44, the number NCB of the blocks from the top block to the midway start block becomes as NCB=TLA (3)=n3 (Step S26).

Then, when the operator gives a command for the machining path display, a machining path display region 48 is generated on the display screen 60, and the machining path 47 from the midway start block BLK (NCB) to the next tool command block BLK (NCN) is displayed as shown in FIG. 8. If the specified tool shape is the tool shape 44, the machining path 47 becomes the one of the third machining step (for the finishing outer diameter) (Steps S27 and S28). When the operator gives a command to start the machining, the machining program starts to execute from the midway start block BLK (NCB) so as to complete all the process (Steps S29 and S30).

Although in the midway start method mentioned above, the tool shapes corresponding to the tool numbers designated in the tool command block are displayed and a tool shape of the machining step from which the operator wishes to start midway the machining program is selected therefrom, the tool shapes may be replaced with tool numbers or offset numbers. Such the method may be conveniently used in a numerical control system which is not equipped with graphic functions, but the implementation method is omitted in description as it is similar to the above method where the tool shapes are displayed.

According to this invention as described in detail in the foregoing, because a machining program may be started midway from the top block of a machining step an operator wishes to start from simply by selecting with a cursor key or the like the tool number, the tool offset number or the tool shape of the tool to be used in the machining step out of the tool numbers, the tool offset numbers or the tool shapes displayed on the screen, the operator can specify the block from which the program should start midway even if the particular step is positioned in the latter part of the machining program with only a small number of key manipulations. Moreover, the operator does not have to find a block from which he/she wishes to start midway the machining program out of the numberless blocks displayed on the screen to thereby enhance the efficiency of the process.

It should be understood that many modifications and adaptations of the invention will become apparent to those skilled in the art and it is intended to encompass such obvious modifications and changes in the scope of the claims appended hereto.

What is claimed is:

1. A midway start method in a numerical control system wherein a specified block is selected as a midway start block out of the blocks of a machining program to execute the machining program from said selected midway start block, which comprises the steps of extracting a tool command block wherein a tool exchange command is written from said machining program, displaying the tool numbers or tool offset numbers in the unit of said tool command block, selecting a specified tool number or the tool offset number out of said tool numbers or the tool offset numbers, and determining the tool command block wherein said specific tool number or the specific tool offset number is written as said midway start block.

2. A midway start method in a numerical control system claimed in claim 1 including the step of displaying the machining track from said midway start block to the tool command block which is immediately subsequent to said midway start block before executing the program from said midway start block.

3. A midway start method in a numerical control system wherein a specified block is selected as a midway start block out of the blocks of a machining program to execute the machining program from said selected midway start block, which comprises the steps of preparing tool drawing data for each tool number or each tool offset number in advance, extracting a tool command block out of said machining program, displaying tool shapes for each of said tool command blocks based on said tool drawing data corresponding to the tool number or the tool offset number designated in said tool command block, selecting a specific tool shape out of said tool shapes, and determining the tool command block wherein the tool number or the tool offset number corresponding to said specific tool shape is written as the midway start block.

4. A midway start method for a numerical control system claimed in claim 3 including the step of displaying the machining track from said midway start block to the tool command block which is immediately subsequent to said midway start block before executing the program from said midway start block.

* * * * *